(12) United States Patent
Angelo et al.

(10) Patent No.: US 12,271,731 B2
(45) Date of Patent: *Apr. 8, 2025

(54) INSTALLATION AND AUTHENTICATION OF APPLICATIONS USING BLOCKCHAIN

(71) Applicant: Micro Focus LLC, Santa Clara, CA (US)

(72) Inventors: Michael F. Angelo, Houston, TX (US); Douglas Max Grover, Rigby, ID (US)

(73) Assignee: Micro Focus LLC, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/481,542

(22) Filed: Oct. 5, 2023

(65) Prior Publication Data

US 2024/0028329 A1     Jan. 25, 2024

Related U.S. Application Data

(63) Continuation of application No. 17/371,877, filed on Jul. 9, 2021, now Pat. No. 11,816,475.

(51) Int. Cl.
*G06F 8/71*     (2018.01)
*G06F 8/61*     (2018.01)
(Continued)

(52) U.S. Cl.
CPC .................. *G06F 8/71* (2013.01); *G06F 8/61* (2013.01); *H04L 9/0643* (2013.01); *H04L 9/3247* (2013.01); *H04L 9/50* (2022.05)

(58) Field of Classification Search
CPC ..... G06F 8/71; G06F 8/61; G06F 8/70; G06F 8/60; H04L 9/0643; H04L 9/3247; H04L 9/50; H04L 9/06; H04L 9/32
(Continued)

(56) References Cited

U.S. PATENT DOCUMENTS 10,572,688 B2    2/2020   Asati et al.
10,650,123 B2    5/2020   Mintz et al.
(Continued)

FOREIGN PATENT DOCUMENTS

WO    WO-2017145009 A1    8/2017

OTHER PUBLICATIONS

Deep et al, "authentication protocol for cloud databases using blockchain mechanism", 2019, [Online], pp. 1-13, [retrieved from internet on Nov. 22, 2024], <https://www.mdpi.com/1424-8220/19/20/4444> (Year: 2019).*

(Continued)

*Primary Examiner* — Bradley A Teets
*Assistant Examiner* — Zengpu Wei
(74) *Attorney, Agent, or Firm* — Sheridan Ross P.C.

(57) ABSTRACT

A request to install a first version of a software application is received. The first version of the software application is stored in a first blockchain in a first distributed blockchain ledger. In response to receiving the request to install the first version of the software application, the first version of the software application is validated by running a hash of the first blockchain. In response to validating the first version of the software application, the first version of the software application is installed from the blockchain to a device. The software application may also be validated after being installed to the device.

20 Claims, 10 Drawing Sheets

(51) Int. Cl.
    *H04L 9/00*           (2022.01)
    *H04L 9/06*           (2006.01)
    *H04L 9/32*           (2006.01)

(58) Field of Classification Search
    USPC .......................................................... 717/170
    See application file for complete search history.

(56) References Cited

U.S. PATENT DOCUMENTS

| | | |
|---|---|---|
| 10,983,781 B2 | 4/2021 | Cecchetti et al. |
| 11,621,855 B2 * | 4/2023 | Lee ...................... H04L 9/3239 713/176 |
| 11,720,549 B1 * | 8/2023 | McKervey ............ H04L 9/3239 707/690 |
| 2019/0340379 A1 | 11/2019 | Beecham |
| 2020/0202318 A1 | 6/2020 | Rab et al. |
| 2020/0250176 A1 * | 8/2020 | Padmanabhan ....... H04L 9/3239 |
| 2020/0252406 A1 * | 8/2020 | Padmanabhan ....... H04L 9/3271 |
| 2020/0387585 A1 | 12/2020 | Martinez et al. |
| 2021/0174634 A1 * | 6/2021 | Purohit ................ H04L 9/3297 |
| 2021/0182773 A1 * | 6/2021 | Padmanabhan .......... G06F 21/35 |

OTHER PUBLICATIONS

Herbert, et al; A Novel method for Decentralised Peer-to-Peer Software License Validation Using Cryptocurrency Blockchain Technology ; Proceedings of the 38th Australasian Computer Science Conference (ASCS 2015); CRPT vol. 159—Computer Science 2015: 9 pages.

Litchfield, et al; ReSOLV: Applying Cryptocurrency Blockchain Method to enable Global Cross-Platform software License Validation; Open Access Article; Cryptography 2018, 2(2), 10; https://doi.org/10.3390/cryptography2020010; May 31, 2018; 29 pages.

* cited by examiner

INSTALLATION AND AUTHENTICATION OF APPLICATIONS USING BLOCKCHAIN

CROSS REFERENCE TO RELATED APPLICATION

The present application is a continuation of U.S. patent application Ser. No. 17/371,877, filed Jul. 9, 2021, entitled "INSTALLATION AND AUTHENTICATION OF APPLICATIONS USING BLOCKCHAIN", which is incorporated herein by this reference in its entirety.

BACKGROUND

With the proliferation of malware, software applications are continually being attacked and compromised. The current strategies include strategies where the software is scanned for malware when it is installed on a system. However, if the malware compromises the software after installation or when the software is launched, the malware application becomes active. In addition, if the software that scans for malware has become compromised, this also leads to malware attacks.

SUMMARY

These and other needs are addressed by the various embodiments and configurations of the present disclosure. The present disclosure can provide a number of advantages depending on the particular configuration. These and other advantages will be apparent from the disclosure contained herein.

A request to install a first version of a software application is received. The first version of the software application is stored in a first blockchain in a first distributed blockchain ledger. In response to receiving the request to install the first version of the software application, the first version of the software application is validated by running an integrity check of the first blockchain. In response to validating the first version of the software application, the first version of the software application is installed from the blockchain to a device.

After the software application is installed a request to validate a software application is received. A signature of the software application is validated with a validator that is loaded from the blockchain. In response validating the signature of the software application with the validator, a response is sent that indicates that the software application is valid. In response to not validating the signature of the software application with the validator, a response is sent that indicates that the software application is not valid.

The phrases "at least one", "one or more", "or", and "and/or" are open-ended expressions that are both conjunctive and disjunctive in operation. For example, each of the expressions "at least one of A, B and C", "at least one of A, B, or C", "one or more of A, B, and C", "one or more of A, B, or C", "A, B, and/or C", and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine", "calculate" and "compute," and variations thereof, as used herein, are used interchangeably and include any type of methodology, process, mathematical operation or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The term "blockchain" as described herein and in the claims refers to a growing list of records, called blocks, which are linked using cryptography. The blockchain is commonly a decentralized, distributed and public digital ledger that is used to record transactions across many computers so that the record cannot be altered retroactively without the alteration of all subsequent blocks and the consensus of the network. Each block contains a cryptographic hash of the previous block, a timestamp, and transaction data (generally represented as a merkle tree root hash). For use as a distributed ledger, a blockchain is typically managed by a peer-to-peer network collectively adhering to a protocol for inter-node communication and validating new blocks. Once recorded, the data in any given block cannot be altered retroactively without alteration of all subsequent blocks, which requires consensus of the network majority. In verifying or validating a block in the blockchain, a hashcash algorithm generally requires the following parameters: a service string, a nonce, and a counter. The service string can be encoded in the block header data structure, and include a version field, the hash of the previous block, the root hash of the merkle tree of all transactions (or information or data) in the block, the current time, and the difficulty level. The nonce can be stored in an extraNonce field, which is stored as the left most leaf node in the merkle tree. The counter parameter is often small at 32-bits so each time it wraps the extraNonce field must be incremented (or otherwise changed) to avoid repeating work. When validating or verifying a block, the hashcash algorithm repeatedly hashes the block header while incrementing the counter & extraNonce fields. Incrementing the extraNonce field entails recomputing the merkle tree, as the transaction or other information is the left most leaf node. The body of the block contains the transactions or other information. These are hashed only indirectly through the Merkle root.

The preceding is a simplified summary to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

DETAILED DESCRIPTION

Figure 1:
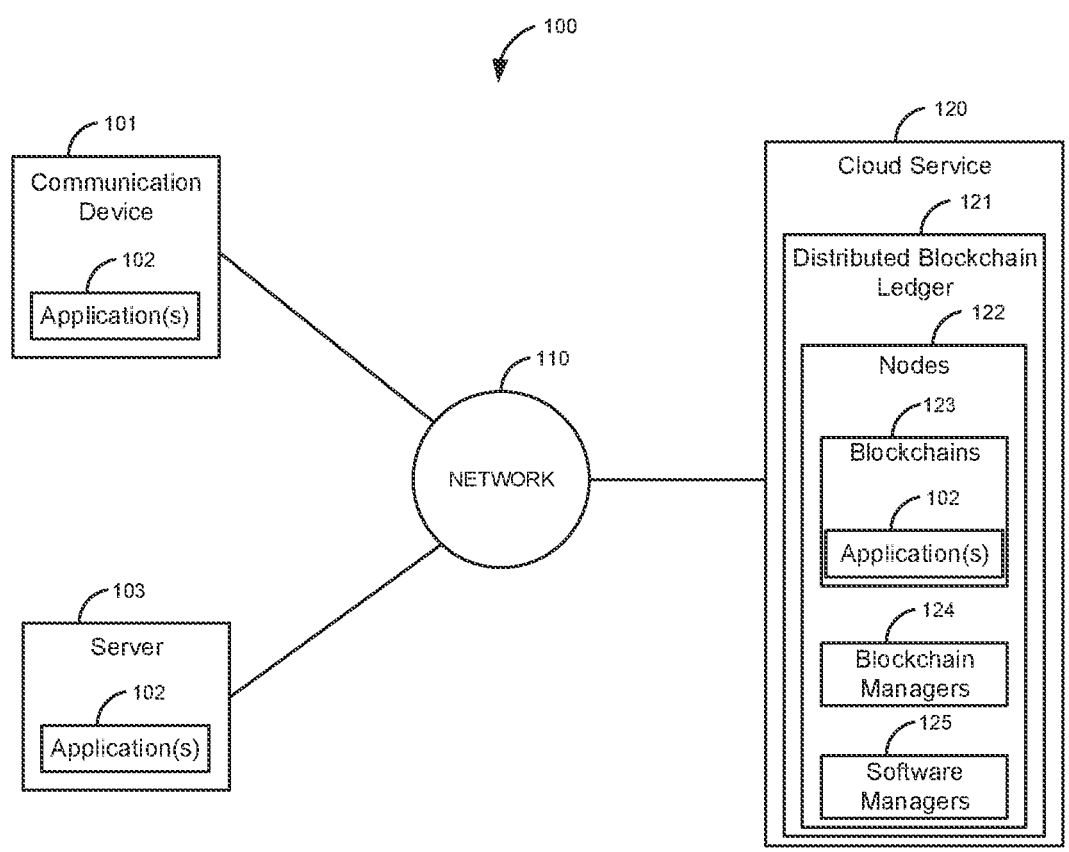
FIG. 1 is a block diagram of a first illustrative system that shows a blockchain in a distributed blockchain ledger used to install an application.

FIG. 1 is a block diagram of a first illustrative system 100 that shows a blockchain 123 in a distributed blockchain ledger 121. The first illustrative system 100 comprises a communication device 101, a server 103, a network 110, and a cloud service 120.

The communication device 101 can be or may include any device that can communicate on the network 110, such as a Personal Computer (PC), a cellular telephone, a Personal Digital Assistant (PDA), a tablet device, a notebook device, a smartphone, and the like. Although only one communication device 101 is shown in FIG. 1, any number of communication devices 101 may be connected to the network 110. The communication device 101 may access the cloud service 120 via the network 110.

The communication device 101 further comprises one or more applications 102. An application 102 can include various types of software applications, such as, a client application, a browser, a word processing application, a spreadsheet application, an email application, a database application, a security application, a network application, an authentication application, and/or the like. An application 102 may comprise multiple applications 102. The application 102 may comprise libraries, configuration information, scripts, and/or the like. In addition, an application 102 may comprise a container, a virtual machine, an operating system, a driver, a kernel loadable module, and/or the like.

The server 103 can be or may include any device that serves the application(s) 102 to users, such as, a web server, an authentication server, a database server, a mainframe, and/or the like. The server 103 may comprise multiple servers 103 that support multiple different applications 102.

The network 110 can be or may include any collection of communication equipment that can send and receive electronic communications, such as the Internet, a Wide Area Network (WAN), a Local Area Network (LAN), a packet switched network, a circuit switched network, a cellular network, a combination of these, and the like. The network 110 can use a variety of electronic protocols, such as Ethernet, Internet Protocol (IP), Hyper Text Markup Language (HTML), Hyper Text Transfer Protocol (HTTP), Web Real-Time Protocol (Web RTC), and/or the like. Thus, the network 110 is an electronic communication network configured to carry messages via packets and/or circuit switched communications.

The cloud service 120 can be or may include any hardware coupled with software that can provide services to the communication device 101/server 103. The cloud service 120 further comprises a distributed blockchain ledger 121. The distributed blockchain ledger 121 comprises a plurality of nodes 122 (e.g., different devices) that have replicated copies of the blockchains 123, the application(s) 102, the blockchain managers 124, and the software managers 125.

The blockchains 123 are copies of the same blockchain 123 that comprise the distributed blockchain ledger 121. The size of the blockchains 123 may vary based on implementation. The blockchains 123 are a form of a replicated distributed database. The blockchains 123 further comprise the application(s) 102.

The blockchain managers 124 can be or may include any hardware coupled with software that can manage the blockchains 123. The blockchain managers 124 work together to determine how to manage the blockchains 123. For example, the blockchain managers 124 may vote to validate a new block being added to the blockchains 123A-123N in the distributed blockchain ledger 121.

The software managers 125 work together to provide installation/verification services of the applications 102 to the communication device 101/server 103. The software managers 125 may be replicated in the nodes 122.

Figure 2:
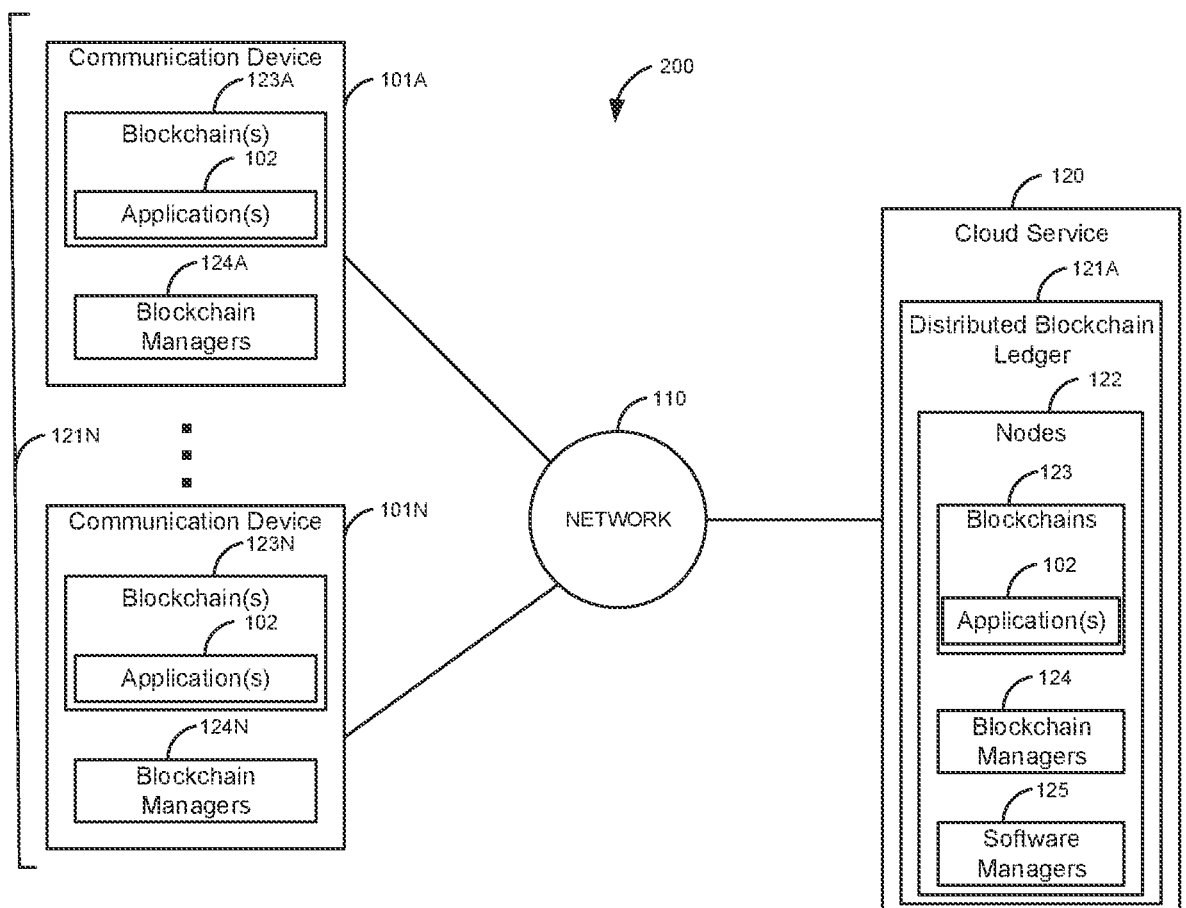
FIG. 2 is a block diagram of a second illustrative system that shows a blockchain in a distributed blockchain ledger used to install an application into another distributed blockchain ledger.

FIG. 2 is a block diagram of a second illustrative system 200 that shows a blockchain 123 in a distributed blockchain ledger 121A that is used to install an application 102 into another distributed blockchain ledger 121N. The second illustrative system 200 comprises communication devices 101A-101N the network 110, and the cloud service 120.

The communication devices 101A-101N comprise blockchains 123A-123N, application(s) 102, and the blockchain managers 124A-124N. The communication devices 101A-101N are similar to the nodes 122. The communication devices 101A-101N may be server nodes (e.g., the server 103).

The blockchains 123A-123N are copies of the same blockchains 123 in the cloud service 120/distributed blockchain ledger 121A. The blockchains 123A-123N comprise the distributed blockchain ledger 121T. The application(s) 102 on the communication devices 101A-101N are a copy (e.g., an installed version of the application 102) that is copied from the blockchains 123 in the distributed blockchain ledger 121A/cloud service 120.

The blockchain managers 124A-124N manage the blockchains 123A-123N in the distributed blockchain ledger 121N. The blockchain managers 124A-124N may be the same as the blockchain managers 124 or may be different from the blockchain managers 124.

The cloud service 120, distributed blockchain ledger 121A, nodes 122, blockchains 123, application(s) 102, blockchain managers 124, and software managers 125 are the same as described in FIG. 1 or may be different based on implementation. The cloud service 120 provides installation services for the distributed blockchain ledger 121T.

Figures 3A, 3B:
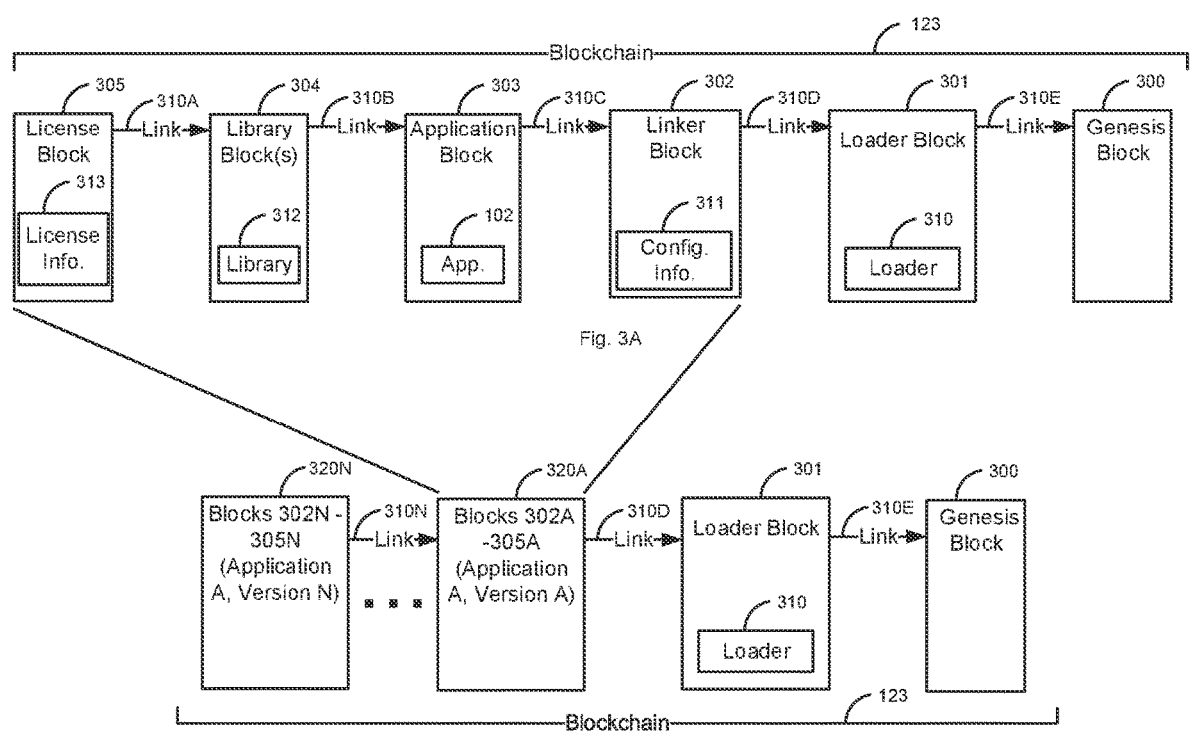
FIG. 3A is a diagram of a first exemplary blockchain for loading a first version of an application from the blockchain.
FIG. 3B is a diagram of a second exemplary blockchain for loading/installing one or more versions of an application from the blockchain.

FIG. 3A is a diagram of a first exemplary blockchain 123 for loading a first version of an application 102 from the blockchain 123. In FIG. 3, the blockchain 123 comprises a genesis block 300, a loader block 301, a linker block 302, an application block 303, one or more library blocks 304, and a license block 305. The blocks 300-305 are linked together via links 310A-301E.

The genesis block 300 is the first block in the blockchain 123. The genesis block 300 is created when the blockchain 123 is first created.

The loader block 301 comprises a loader 310. The loader 310 is used to load the application 102/library(s) 312 from the blockchain 123. The loader 310 uses configuration information 311/license information 313 to determine how the load the application 102/library(s) 312 from the blockchain 123.

The linker block 302 comprises the configuration information 311. The configuration information 311 is used by the loader 310 to know the location of the application block 303/library block(s) 304, and the license block 305. In one embodiment, the configuration information 311 may reside in the genesis block 300 or the loader block 301. In these embodiments, the linker block 302 may not exist in the blockchain 123.

The application block 303 comprises the application 102. The library block(s) 304 comprise the libraries 312. In one embodiment the library block 304 may comprise multiple libraries 312 or a single library 312. The license block 305 comprises the license information 313. The license information 313 describes how the application 102 is to be loaded. For example, the license information 313 may not allow specific features to be enabled (e.g., a library 312 that supports the specific feature may not be loaded or the feature may be not enabled based on the license information 313 in the license block 305.

The order of the blocks 301-305 may occur in different orders based on implementation. For example, the loader block 301 may be at the end of the blockchain 123 or the application block 303 may be after the library block 304. Likewise, the configuration information 311/license information 313 may reside in other blocks (e.g., blocks 300, 301, 302, 303, and 304).

FIG. 3B is a diagram of a second exemplary blockchain 123 for loading/installing one or more versions of an application 102 from the blockchain 123. The blockchain 123 of FIG. 3B comprises the genesis block 300 and the loader block 301. Like in FIG. 3A, the blockchain 123 of FIG. 3B comprises the blocks 302-305 (referred to as blocks 302A-305A and collectively referred to as block 320A). The block 320A is for a first version of the application 102/libraries 312.

The block 320N comprises blocks 302N-305N (appended to the end of the blockchain 123). The block 320N is for a second version of the application 102/libraries 312 (e.g., a new version that is developed after the previous version). Thus, the blockchain 123 of FIG. 3B is a blockchain 123 that comprise multiple versions of the application 102/libraries 312. In FIG. 3B, the application 102 and all the libraries 312 have been updated to a new version. For example, block 320A comprises version 1.0 of the application 102/libraries 312 and block 320N comprises version 2.0 of the application 102/libraries 312.

By having the ability of support multiple versions, an installed blockchain 123T (e.g., as described in FIG. 6) can allow a tenant (e.g., a customer) to dynamically upgrade the application 102 while maintaining the integrity of the installed blockchain 123T. Thus, the tenant does not have to install a new blockchain 123, but can use the existing blockchain 123.

Figure 4:
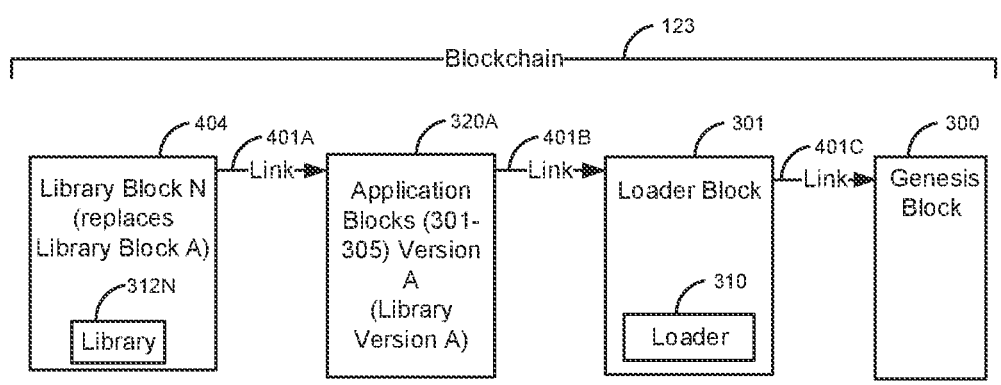
FIG. 4 is a diagram of a process for updating a blockchain based on a new version of a library.

FIG. 4 is a diagram of a process for updating a blockchain 123 based on a new version of a library 312. In FIG. 3B, the process is for updating the application 102 and all the libraries 312. FIG. 4 is an example, of a partial update for a new version of the application 102/libraries 312. For example, a patch update (e.g., version 1.01) where only one of the libraries 312 have been updated.

The blockchain 123 comprise the genesis block 300, the loader block 301, and the block 320A as described in FIG. 3A. When the new library 312 is updated in the new release, the library block 404 is appended to the end of the blockchain 123. The blockchain 123 is linked together via links 401A-401C. The loader 310 uses version information that is stored in the application block 303/library block(s) 304/404 to determine that the new library block 404 is an update to the application 102. The loader 310 then loads the application 102/library 312N accordingly.

While the process of FIG. 4 is described using a library 312 as an example, the process will work for where the application 102 is updated while the libraries 312 are not updated. In this example, the block 404 would be an new application block 303 instead of a new library block 404.

In addition, the process of FIG. 4 will work where the license has been upgraded/downgraded/changed. In this case, a new license block 305 would be added to the end of the blockchain 123. This may be in addition to the library block 404.

Figure 5:
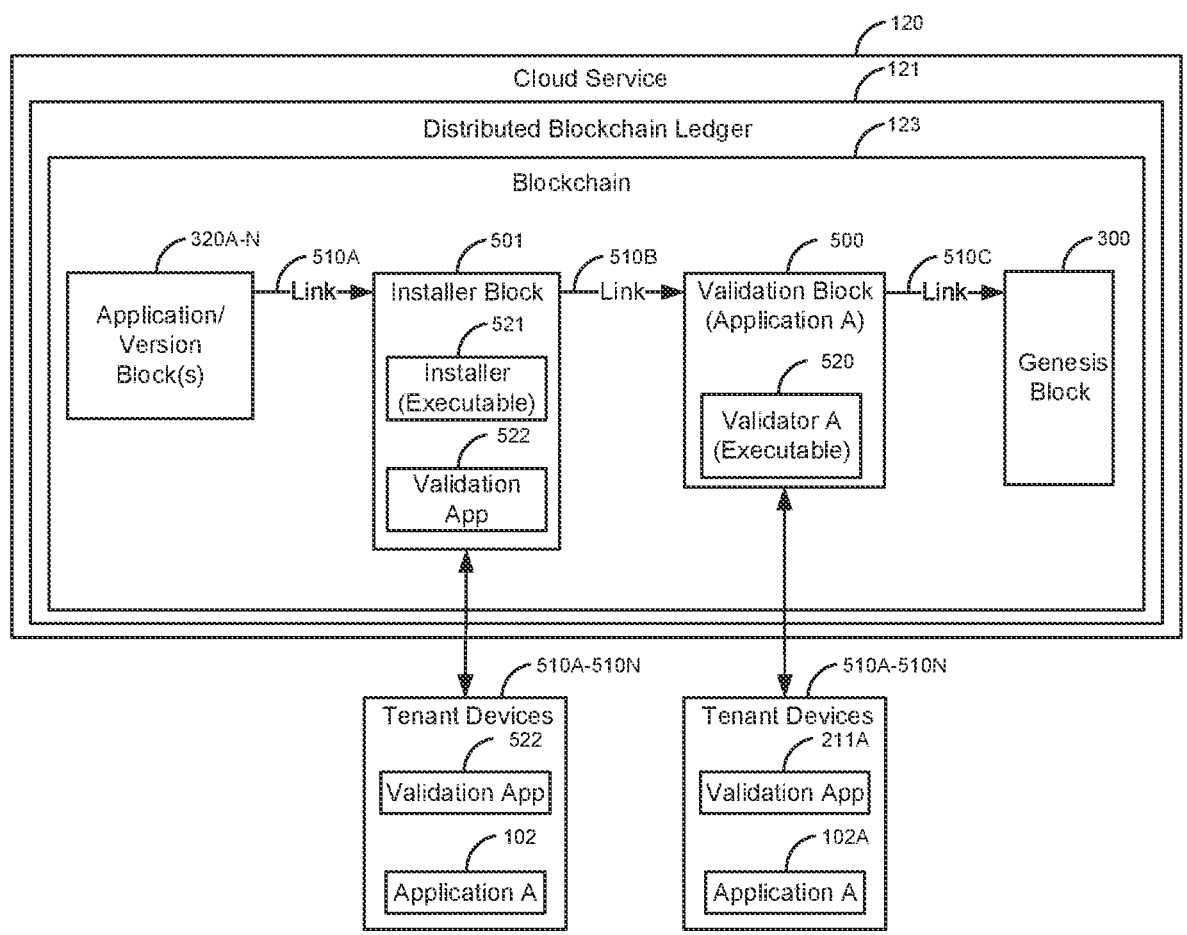
FIG. 5 is a diagram of a process for installing and validating an application from a blockchain in a cloud service.

FIG. 5 is a diagram of a process for installing and validating an application 102 from a blockchain 123 in a cloud service 120. In FIG. 5, the blockchain 123 comprises the genesis block 300, a validation block 500, an installer block 501, the blocks 320A-320N as described in FIGS. 3-4, and tenant devices 510A-510N.

The validation block 500 comprises a validator 520. In this example, the validator 520 is for application A 102. The validator 520 is used to validate an application 102/libraries 312 that are going to be loaded or are loaded on a tenant device 510. A tenant device 510 may be a communication device 101, a server 103, and/or the like.

The installer block 501 includes an installer 521 and a validation application 522. The installer 521 is used to install the application 102/libraries 312 (in the block(s) 320A-320N) from the blockchain 123 to the tenant devices 510A-510N. The validation application 522 may also be downloaded as part of the installation process to the tenant devices 510A-510N.

When a tenant wants to install the application 102/libraries 312 to a tenant device 510, the blockchain 123 is validated to make sure that the installer 521/application 102/libraries 312/configuration information 311/license information 313 have not been compromised. The installer 521 in the installer block 501 is then executed and installs the application 102/libraries 312/configuration data 311 to the tenant device 510 from the blockchain 123.

If the tenant wants to execute the application 102, the validation application 522 is loaded (or is already running). The validation application 522 communicates with the validator 520 that was loaded from the blockchain 123. Before the validator 520 is executed, the blockchain hash is validated (an integrity check) to confirm that the validator 520 has not been compromised. The validator 520 can confirm that the application 102 is valid. For example, the validation application 522 could do a forward/reverse hash of the application 102/libraries 312/configuration data 311 and send the results (the computed hash(es)) to the validator 520, which compares the hashes to a known hash value(s) for the particular version of the application 102/libraries 312. The validator 520 may also verify the installation data from the installation step.

In one embodiment, the blockchain 123 may have a link to the installer 521, a link to the application 102/library 312, a link to the validation application 522, and/or a link to the validator 520. In this example, when validating the installer 521/validation application 522, application 102, library 312, the cloud service 120 runs a hash over the validation application 522/installer 521/application 102/library 312 based on hashes that are stored in the blockchain 123 (an integrity check).

In addition, the validator application 522 may validate the application 102/libraries 312 after it has been loaded in memory. This may include detecting a signature of data being used by the application 102 along with hashing the code that is loaded into memory.

Figure 6:
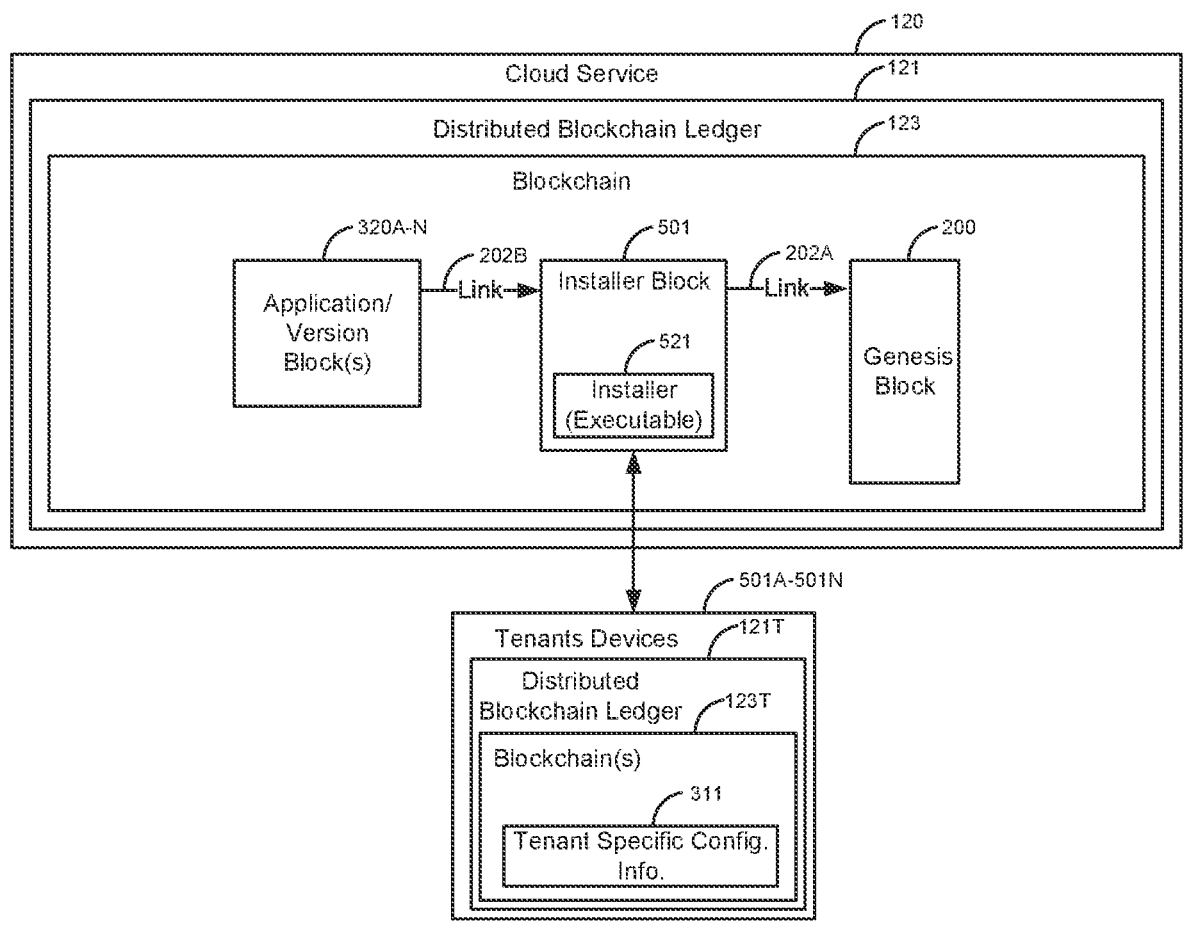
FIG. 6 is a diagram of a process for installing different application(s)/versions of the application from a first blockchain in a distributed blockchain ledger to a tenant distributed blockchain ledger.

FIG. 6 is a diagram of a process for installing different application(s) 102/versions of the application(s) 102 from a first blockchain 123 in a distributed blockchain ledger 121 to a tenant distributed blockchain ledger 121T. The process of FIG. 6 is similar to the process of FIG. 5. However, the process of FIG. 6 differs in that the blockchain 123 is installed into a tenant distributed blockchain ledger 121T.

When the application 102 is be installed as discussed in FIG. 5, the blockchain 123 in the cloud service 120 is validated. The blockchain 123 is then installed to the tenant distributed blockchain ledger 121T. The installation may include all or some elements of the blockchain 123. For example, the blocks 300-305 may be installed into the tenant distributed blockchain ledger 121T. Alternatively only a portion of the blocks 300-305 may be installed to the tenant distributed blockchain ledger 121T. For example, the blockchain 123 may have two different license blocks 305. Only one license block 305 is installed based on what options the tenant purchases. Different library blocks 304 may be installed based on what license the tenant purchases. For example, a subset of the library blocks 304 may be installed in the tenant blockchain 123T because of license options (e.g., a lower price option does not use library X). The blocks 301-305 may have different information (e.g., block 302 may have different configuration information 311) based on how/where the tenant defines to download the blockchain 123 in the distributed blockchain ledger 121T.

In this embodiment, the validation application 522/validator 520 are not needed because the installed application 102 is secured by its own tenant blockchain 123T in the tenant distributed blockchain ledger 121T. When the application 102 in the tenant environment is validated and loaded directly from the tenant blockchain 123T in the tenant distributed blockchain ledger 121T.

Figure 7:
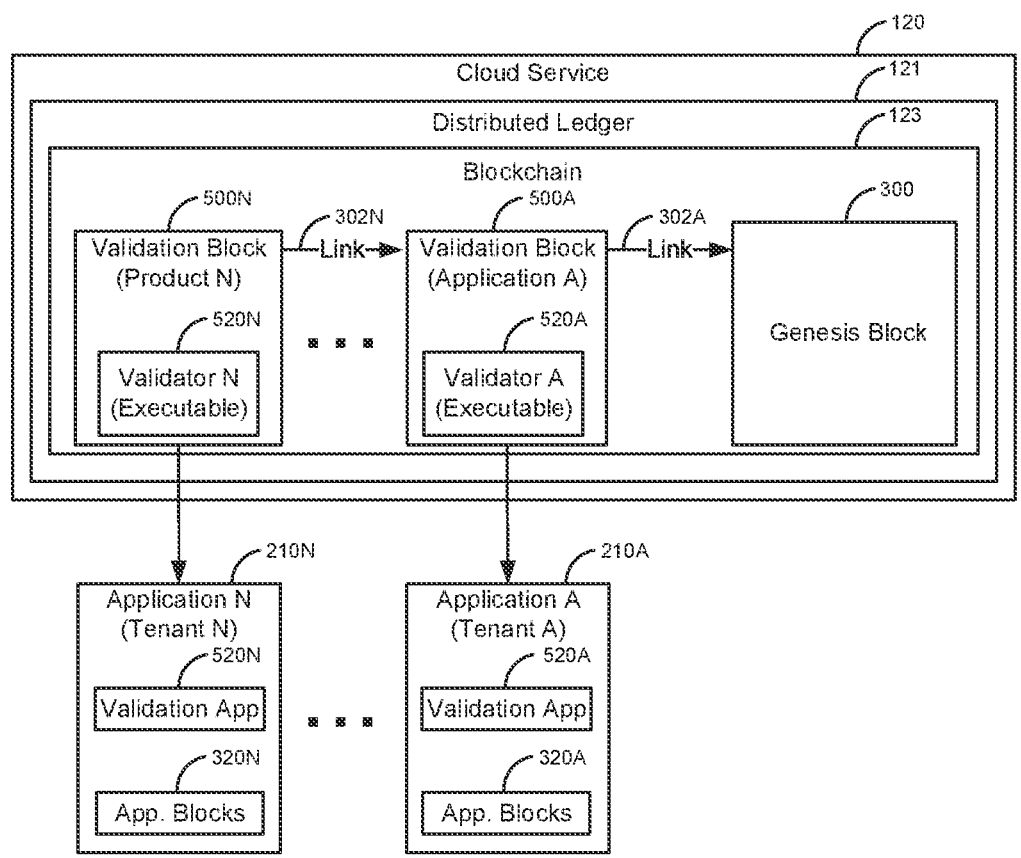
FIG. 7 is a diagram of a process for validating different applications from a blockchain.

FIG. 7 is a diagram of a process for validating different applications 102 from a blockchain 123. In FIG. 7, the blockchain 123 comprises the genesis block 300 and validation blocks 500A-500N. The validation blocks 500A-500N are for different applications 102. Each of the validation blocks 500A-500N comprise a validator 520A-520N. The validators 520A-520N are for different applications 102. For example, the validator 520A may be for a word processing application 102 and the validator 520N may be for a web application 102.

The validation process for FIG. 7 works similar to the validation process of FIG. 5 where the validation is for an application 102 that does not reside in a blockchain 123. In FIG. 7, the cloud service 120 can provide different validation services for different types of applications 102 from the same blockchain 123. Alternatively, each validator block 500/validator 520 can be in separate blockchains 123.

Figure 8:
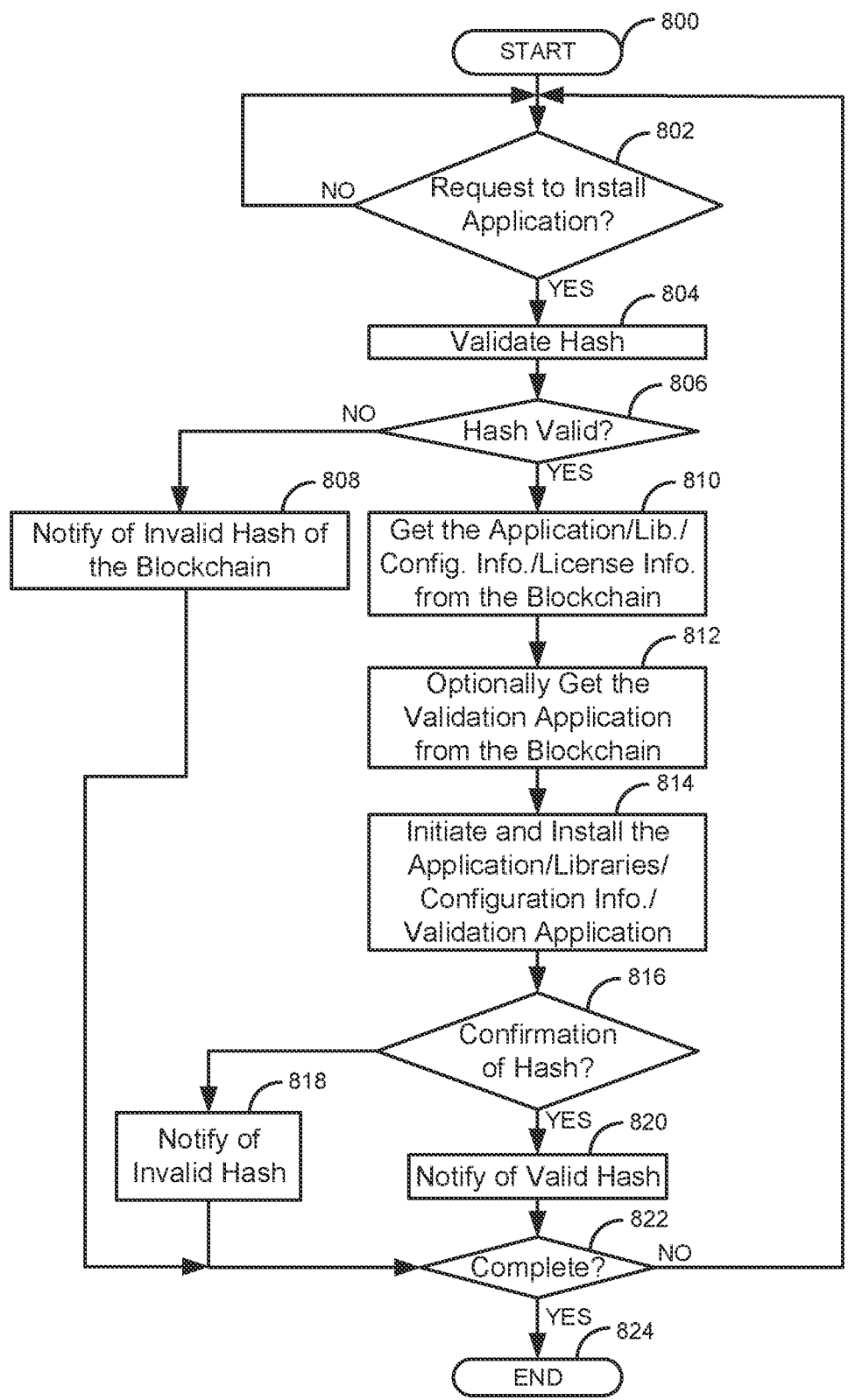
FIG. 8 is a flow diagram of a process for installing an application from a blockchain.
Figure 9:
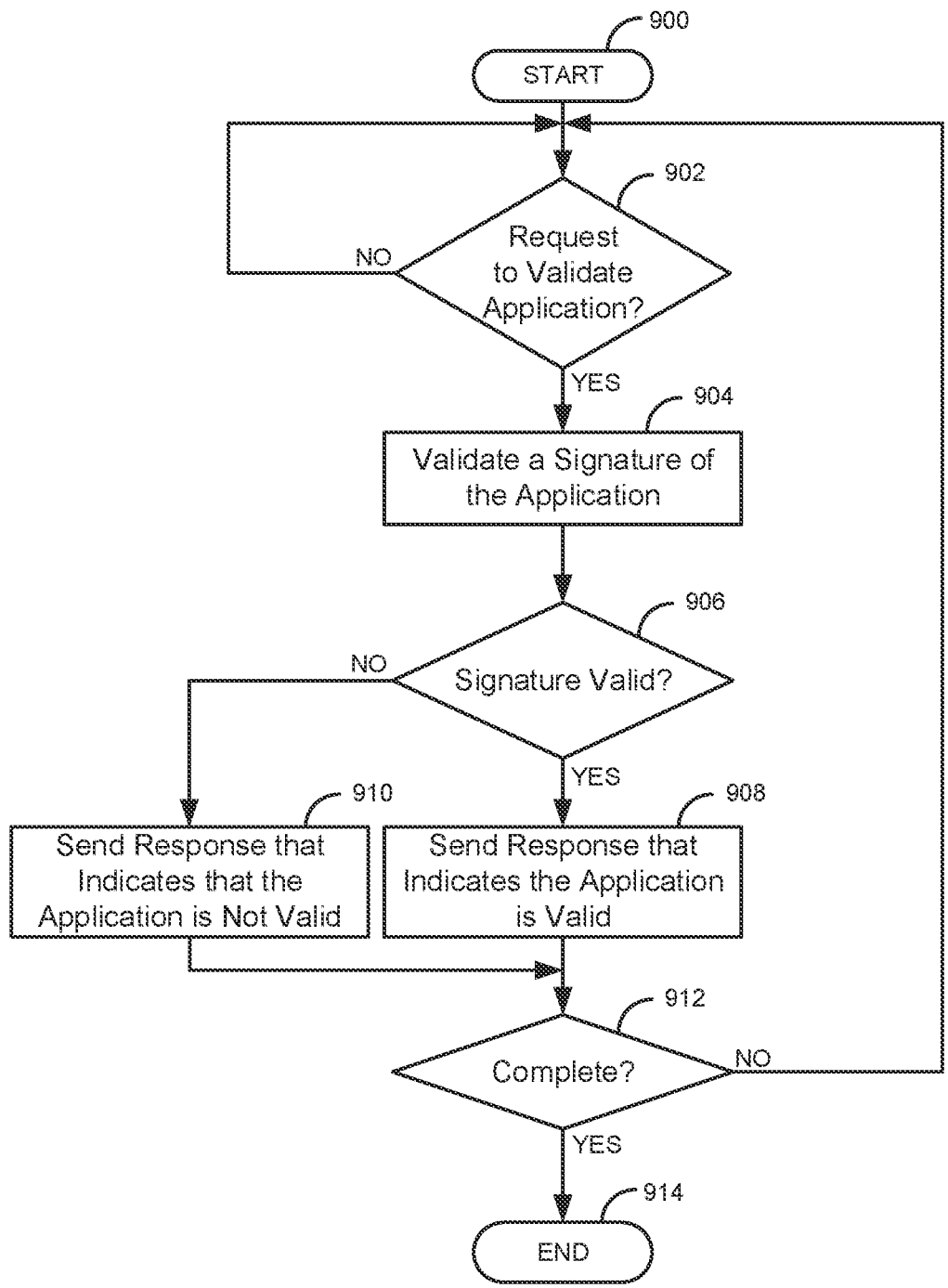
FIG. 9 is a flow diagram of a process for validating an application.
Figure 10:
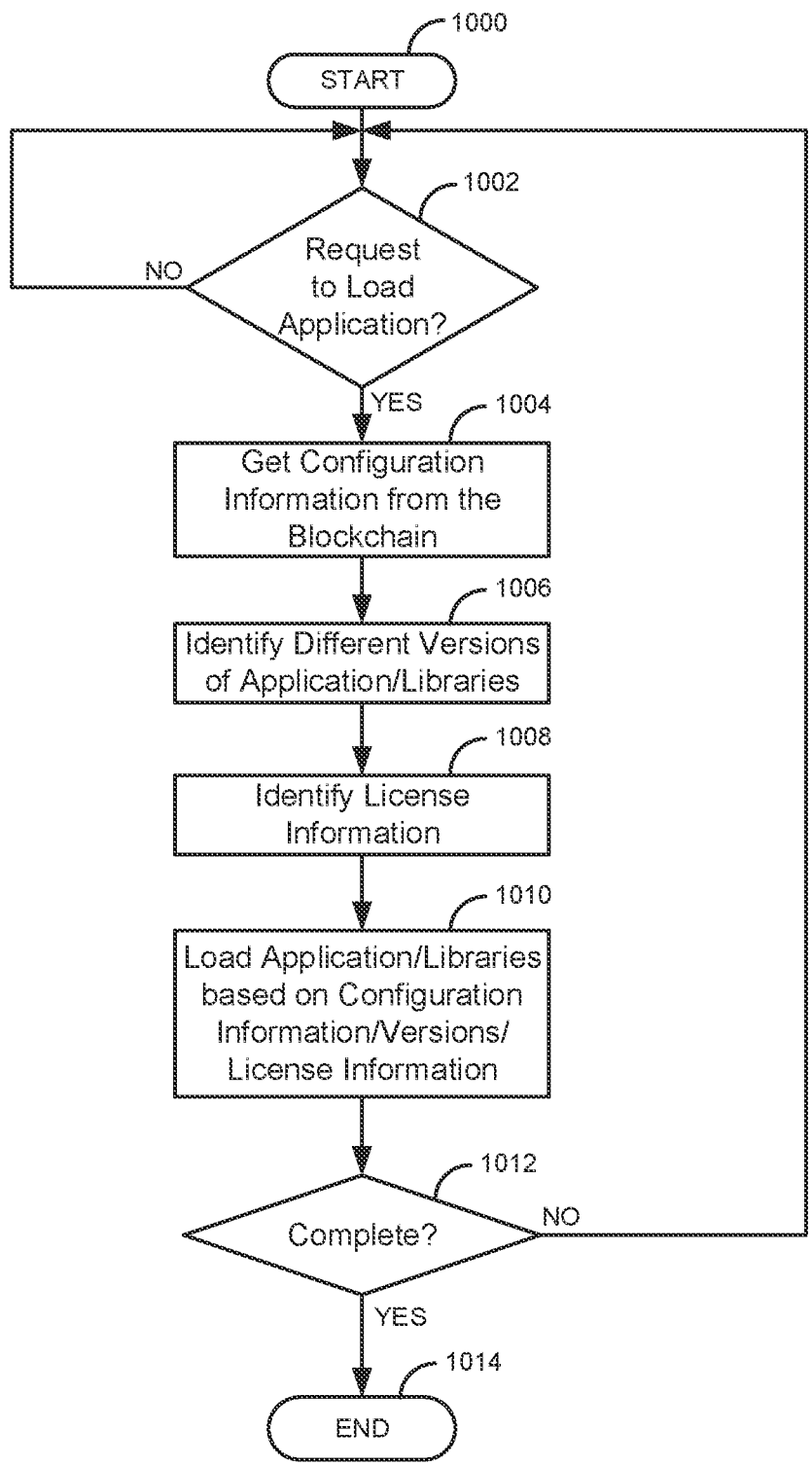
FIG. 10 is a flow diagram of a process for loading an application from a blockchain based on configuration information, version information, and/or licensing information.

FIG. 8 is a flow diagram of a process for installing an application 102 from a blockchain 123. Illustratively, the communication device 101, the application(s) 102, the server 103, the cloud service 120, the distributed blockchain ledger 121, the nodes 122, the blockchains 123, the blockchain managers 124, and the software managers 125, are stored-program-controlled entities, such as a computer or microprocessor, which performs the method of FIGS. 8-10 and the processes described herein by executing program instructions stored in a computer readable storage medium, such as a memory (i.e., a computer memory, a hard disk, and/or the like). Although the methods described in FIGS. 8-10 are shown in a specific order, one of skill in the art would recognize that the steps in FIGS. 8-10 may be implemented in different orders and/or be implemented in a multi-threaded environment. Moreover, various steps may be omitted or added based on implementation.

The process starts in step 800. The process determines, in step 802, if a request to install an application 102 is received by the cloud service 120. If a request to install an application 102 is not received in step 802, the process of step 802 repeats. Otherwise, if a request to install an application 102 is received in step 802, the process validates the hash of the blockchain 123 (an integrity check). If the hash of the blockchain 123 is not valid in step 806, a notification of the invalid hash is sent in step 808. For example, an administrator for the cloud service 120 may be notified that the hash of the blockchain 123 is not valid. Likewise, the requestor of the install may be notified. The process then goes to step 822.

Otherwise, if the hash of the blockchain 123 is valid in step 806, the process gets, in step 810, the application 102, the libraries 312 (if any), the configuration information 311, and the license information 313 (if any) from the blockchain 123. The process optionally gets the validation application 522 from the blockchain 123 in step 812. The validation application 522 is optional based on implementation. For example, the validation application 522 may not be used if the tenant does not subscribe to the validation service or where the application 102 is installed to a tenant distributed blockchain ledger 121T as described in FIG. 6.

The process the initiates and installs the application 102/libraries 312/configuration information 311 and the validation application 522 (if required) in step 814. Step 814 may also include installing the blockchain managers 124A-124N into the tenant distributed blockchain ledger 121T (if the installation is into a tenant distributed blockchain ledger 121T). As part of the installation process, the tenant device 510 may run a hash (an integrity check) of the installed application 102 in step 816. If the hash of the installed application 102 is not valid in step 816, the cloud service 120 and/or tenant is notified of the invalid hash in step 818. The process then goes to step 822. Otherwise if the hash is valid in step 816, the cloud service 120/tenant is notified of the valid hash/download in step 820.

The process determines, in step 822, if the process is complete. If the process is not complete in step 822, the process goes back to step 802. Otherwise, the process ends in step 824.

FIG. 9 is a flow diagram of a process for validating an application 102. The process starts in step 900. The process determines, in step 902, if a request to validate the application 102 is received by the cloud service 120. If the request to validate the application 102 has not been received in step 902, the process of step 902 repeats.

Otherwise, if the request to validate the application 102 has been received by the cloud service 120 in step 902, the process validates the signature of the application 102 in step 904. In one embodiment, the request has a hash (or some other kind of signature) of the application 102 (including libraries 312). The received hash is compared to a known hash of the application 102 (including the libraries 312) as an integrity check of the application 102. Alternatively, the application 102 and individual libraries 312 may each have their own hash. If the signature/hash is valid in step 906, the process sends a response that indicates that the application 102 is valid in step 908. The process then goes to step 912. Otherwise, if the hash is invalid in step 906, the process sends a response that indicates the application 102 is invalid in step 910. The message may be sent to the tenant device 510. The process then goes to step 912.

The process determines, in step 912 if the process is complete. If the process is not complete in step 912, the process goes back to step 902. Otherwise, if the process is complete in step 912, the process ends in step 914.

FIG. 10 is a flow diagram of a process for loading an application 102 from a blockchain 123 based on configuration information 311, version information, and/or licensing information 313. The process of FIG. 10 is based on the configuration of FIGS. 2 and 6 where the blockchain 123 is installed into the tenant distributed blockchain ledger 121T. As part of the creation of the new tenant distributed blockchain ledger 121T, the blockchain managers 124A-124N are installed into tenant devices 510A-510N. The blockchain managers 124A-124N implement the process of FIG. 10 using the tenant distributed blockchain ledger 121T.

The process starts in step 1000. The blockchain manager 124 determines, in step 1002, if a request to load the application 102 is received. If the request to load the application 102 is not received in step 1002, the process of step 1002 is repeated. Otherwise, if the request to load the application 102 is received in step 1002, the blockchain manager 124 gets, in step 1004, the configuration information 311 from the tenant blockchain 123T. The configuration information 311 may contain information about how to initialize the application 102, location(s) of the blocks 301-305, and/or the like.

The blockchain manager 124 identifies different versions of the application 102/libraries 312 in step 1006. The blockchain manager 124 can identify different versions based on versioning information in the application block(s) 303, library block(s) 304, and/or license blocks 305. The information about the versions is used by the loader 310 to determine which version of the application 102/library(s) 312 to load. The blockchain manager 124 then identifies the license information 313 in step 1008. The license information 313 may identify specific features of the application 102 that have been licensed. The license information 313 may be used to configure the application 102 when the loader 310 loads the application 102/libraries 312 from the tenant blockchain 123T. The loader 310 then loads, in step 1010, the application 102/libraries 312 based on the configuration information 311, the versions, and the license information 313.

The blockchain manager 124 then determines, in step 1012, if the process is complete. If the process is not complete in step 1012, the process goes back to step 1002. Otherwise, if the process is complete in step 1012, the process ends in step 1014.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Any of the steps, functions, and operations discussed herein can be performed continuously and automatically.

However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should however be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosure.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A system comprising:
a microprocessor; and
a computer readable medium, coupled with the microprocessor and comprising microprocessor readable and executable instructions that, when executed by the microprocessor, cause the microprocessor to:
receive a request to validate a software application;
load a validator from a blockchain;
validate a signature of the software application with the validator;
in response to successfully validating the signature of the software application with the validator, send a response that indicates that the software application is valid; and
in response to unsuccessfully validating the signature of the software application with the validator, send a response that indicates that the software application is not valid.

2. The system of claim 1, wherein a validator application is also installed with the software application, wherein the validator application works in conjunction with the validator to validate the software application, and wherein the validator application is installed from the blockchain.

3. The system of claim 1, wherein blockchain comprises a plurality of blocks that each comprises an individual validator for a different software application and wherein each individual validator validates each individual different software application.

4. The system of claim 1, wherein the microprocessor readable and executable instructions, when executed by the microprocessor, cause the microprocessor to:
receive a request to install a first version of the software application, wherein the first version of the software application is stored in a first blockchain in a first distributed blockchain ledger;
in response to receiving the request to install the first version of the software application, validate the first version of the software application by running an integrity check of the first blockchain; and
in response to validating the first version of the software application, install the first version of the software application from the blockchain to a device.

5. The system of claim 4, wherein installing the first version of the software application to the device comprises installing the first version of the software application into a second blockchain in a second distributed blockchain ledger.

6. The system of claim 5, wherein the first blockchain comprises a plurality of license blocks for the software application and wherein the second blockchain comprises a single license block for the software application.

7. The system of claim 5, wherein the second blockchain comprises a loader block, wherein the loader block comprises a loader, wherein the loader loads the first version of the software application from the second blockchain into a memory based on at least one of configuration information, license information, and version information, and wherein the at least one of the configuration information, the license information, and information is stored in the second blockchain.

8. The system of claim 5, wherein the first blockchain comprises a second version of the software application and wherein the microprocessor readable and executable instructions further cause the microprocessor to:
install the second version of the software application into the second blockchain in the second distributed blockchain ledger, wherein installing the second version of the software application into the second blockchain in the second distributed blockchain ledger comprises appending one or more blocks that comprise the second version of the software application to the second blockchain.

9. A method comprising:
receiving, by a microprocessor, a request to validate a software application;
validating, by the microprocessor, a signature of the software application with a validator, wherein the validator is loaded from a blockchain;
in response to validating the signature of the software application with the validator, sending, by the microprocessor, a response that indicates that the software application is valid; and
in response to not validating the signature of the software application with the validator, sending, by the microprocessor, a response that indicates that the software application is not valid.

10. The method of claim 9, further comprising:
installing, from the blockchain, a validator application with the software application, wherein the validator application works in conjunction with the validator to validate the software application.

11. The method of claim 9, wherein the blockchain comprises a plurality of blocks that each comprises an individual validator for a different software application, wherein each individual validator validates each individual different software application, and wherein the request to validate the software application comprises the signature of the software application.

12. The method of claim 9, further comprising:
receiving, by the microprocessor, a request to install a first version of a software application, wherein the first version of the software application is stored in a first blockchain in a first distributed blockchain ledger;
in response to receiving the request to install the first version of the software application, validating, by the microprocessor, the first version of the software application by running integrity check of the first blockchain; and in response to validating the first version of the software application, installing, by the microprocessor, the first version of the software application from the blockchain to a device.

13. The method of claim 12, wherein installing the first version of the software application to the device comprises installing the first version of the software application into a second blockchain in a second distributed blockchain ledger and wherein the first blockchain comprises a plurality of license blocks and wherein the second blockchain comprises a single license block.

14. The method of claim 12, wherein installing the first version of the software application to the device comprises installing the first version of the software application into a second blockchain in a second distributed blockchain ledger, wherein the second blockchain comprises a loader block, wherein the loader block comprises a loader, wherein the loader loads the first version of the software application from the second blockchain into a memory based on at least one of configuration information, license information, and version information, and wherein the at least one of the configuration information, the license information, and the version information is stored in the second blockchain.

15. The method of claim 12, wherein installing the first version of the software application to the device comprises installing the first version of the software application into a second blockchain in a second distributed blockchain ledger, wherein the first blockchain comprises a second version of the software application, and further comprising:

installing the second version of the software application into the second blockchain in the second distributed blockchain ledger, wherein installing the second version of the software application into the second blockchain in the second distributed blockchain ledger comprises appending one or more blocks that comprise the second version of the software application to the second blockchain.

16. The method of claim 12, wherein installing the first version of the software application to the device comprises installing the first version of the software application into a second blockchain in a second distributed blockchain ledger, wherein the first version of the software application comprises a first version of a software library, wherein a second version of the software application comprises a second version of the software library, wherein a block that comprises the second version of the software library is appended to the second blockchain, wherein the second blockchain in the second distributed blockchain ledger comprises a loader block, a plurality of application blocks, and a library block, wherein the plurality of application blocks comprises a plurality of different applications, and wherein an installer from an installer block in the first blockchain installs the plurality of different applications from the first blockchain to a plurality of devices.

17. A non-transitory machine-readable storage medium storing instructions that upon execution cause a microprocessor to:

receive a request to validate a software application;

validate a signature of the software application with a validator, wherein the validator is loaded from a blockchain;

in response to validating the signature of the software application with the validator, send a response that indicates that the software application is valid; and in response to not validating the signature of the software application with the validator, send a response that indicates that the software application is not valid.

18. The non-transitory machine-readable storage medium of claim 17, wherein a validator application is also installed with the software application, wherein the validator application works in conjunction with the validator to validate the software application, and wherein the validator application is installed from the blockchain.

19. The non-transitory machine-readable storage medium of claim 17, wherein the blockchain comprises a plurality of blocks that each comprises an individual validator for a different software application and wherein each individual validator validates each individual different software application.

20. The non-transitory machine-readable storage medium of claim 17, wherein the request to validate the software application comprises the signature of the software application.

* * * * *